United States Patent
Inoue et al.

(10) Patent No.: US 9,018,872 B2
(45) Date of Patent: Apr. 28, 2015

(54) MOTOR CONTROL CIRCUIT

(75) Inventors: Tomohiro Inoue, Yonago (JP); Yuji Hamada, Hyogo (JP)

(73) Assignees: Minebea Co., Ltd., Kitasaku-gun (JP); Panasonic Corporation, Kadoma-shi (JP)

( * ) Notice: Subject to any disclaimer, the term of this patent is extended or adjusted under 35 U.S.C. 154(b) by 197 days.

(21) Appl. No.: 13/991,002

(22) PCT Filed: Dec. 8, 2011

(86) PCT No.: PCT/JP2011/078484
§ 371 (c)(1),
(2), (4) Date: May 31, 2013

(87) PCT Pub. No.: WO2012/077768
PCT Pub. Date: Jun. 14, 2012

(65) Prior Publication Data
US 2013/0249456 A1    Sep. 26, 2013

(30) Foreign Application Priority Data

Dec. 8, 2010 (JP) .................................. 2010-273954

(51) Int. Cl.
H02P 6/16 (2006.01)
H02P 6/14 (2006.01)

(52) U.S. Cl.
CPC .................................... H02P 6/145 (2013.01)

(58) Field of Classification Search
USPC .......... 318/400.14, 268, 59, 64, 66, 101, 503, 318/721, 722, 723, 802, 400.04, 400.06, 318/400.07, 90
See application file for complete search history.

(56) References Cited

U.S. PATENT DOCUMENTS

| 4,310,791 | A | * | 1/1982 | Akamatsu | 318/800 |
| 4,601,568 | A | * | 7/1986 | Takano et al. | 399/200 |
| 5,023,924 | A | * | 6/1991 | Tajima et al. | 388/811 |
| 5,777,447 | A | * | 7/1998 | Okano | 318/434 |
| 6,644,434 | B2 | | 11/2003 | Fujii et al. | |

(Continued)

FOREIGN PATENT DOCUMENTS

| JP | A-5-211796 | 8/1993 |
| JP | A-2002-308121 | 10/2002 |
| JP | A-2005-192338 | 7/2005 |

OTHER PUBLICATIONS

Mar. 13, 2012 International Search Report issued in International Patent Application No. PCT/JP2011/078484.

*Primary Examiner* — Rita Leykin
(74) *Attorney, Agent, or Firm* — Oliff PLC

(57) ABSTRACT

To provide a motor control circuit that variably controls the speed of a motor, in which an appropriate advance angle value corresponding to the speed of the motor that is set can be automatically set. The motor control circuit according to the present invention includes an advance angle setting means that adds a reference advance angle value to an advance angle correction value obtained by multiplying a proportional coefficient by a correction amount and outputs an advance angle setting signal, and an advance angle setting correction means that uses a ratio of a correction reference period relative to a period of a reference signal input from the outside as a correction amount and corrects the reference advance angle value by an advance angle correction value obtained by multiplying the correction amount by a predetermined proportional coefficient of the advance angle setting means.

4 Claims, 4 Drawing Sheets

(56) References Cited

U.S. PATENT DOCUMENTS

| | | | |
|---|---|---|---|
| 6,803,739 B2 * | 10/2004 | Miyata et al. | 318/700 |
| 7,157,870 B2 * | 1/2007 | Nakagawa et al. | 318/400.01 |
| 7,750,594 B2 * | 7/2010 | Clothier et al. | 318/799 |
| 8,091,523 B2 * | 1/2012 | Mikawa et al. | 123/90.17 |
| 8,519,658 B2 * | 8/2013 | Takeuchi | 318/599 |
| 2002/0148676 A1 | 10/2002 | Fujii et al. | |

* cited by examiner

F I G. 1
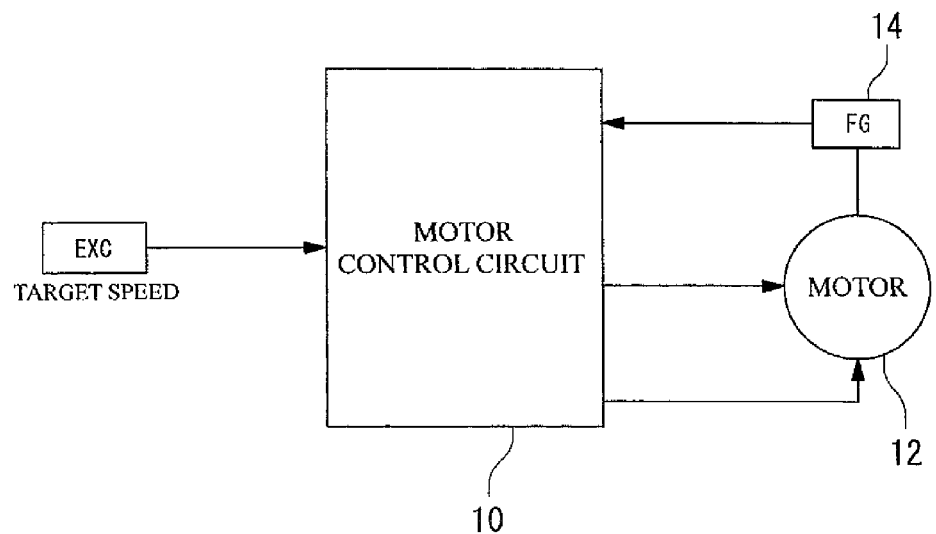

F I G. 4
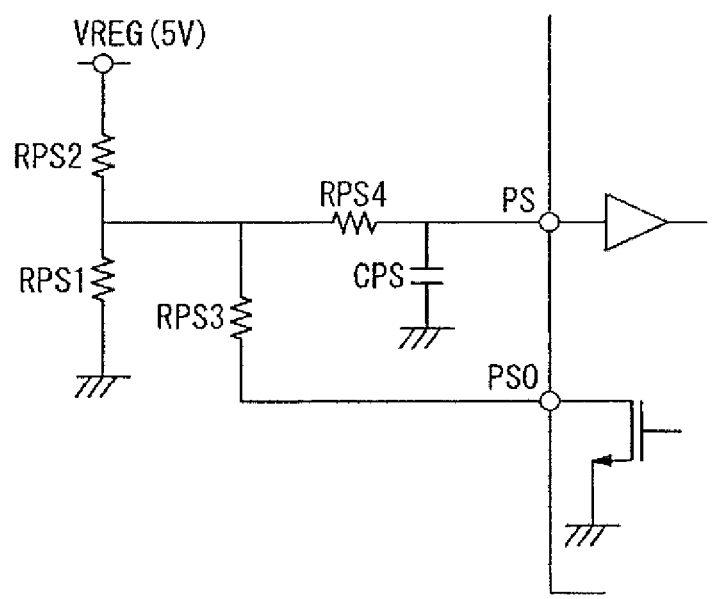

MOTOR CONTROL CIRCUIT

TECHNICAL FIELD

The present invention relates to a motor control circuit that variably controls the rotational speed of a motor.

BACKGROUND ART

Recently, technical advances in OA equipment such as copying machines and page printers are progressing with relation to color, precision, and digitalization. In accordance with such advances, motors used in such equipment must be able to operate with high rotational speed accuracy over a wide range of rotational speeds. Further, control circuits for controlling such motors must be equipped with optimal control functions at every number of rotations over a wide range of rotational speeds.

Further, as a drive system for such a motor, there has been a general shift from conventional square wave drive to sine wave drive in which the applied voltage of the motor winding is a sine wave from the perspective of increasing the quietness and the like. In order to maintain high efficiency in sine wave drive, it has been known that advance angle control to adjust a delay in the phase of a winding current relative to the phase of a motor induced voltage is important.

Conventionally, as a motor control circuit equipped with advance angle control, a controller 107 like that shown in FIG. 3 has been proposed (for example, refer to Patent Literature 1). The controller 107 shown in FIG. 3 is an example of a motor control circuit that controls a three-phase brushless motor (hereinafter referred to simply as "motor") 106 used in a hydraulic power steering system.

The controller 107 includes a target rotation number calculation means 173 that calculates a target rotation number based on an input from a rudder angle sensor 111 and a vehicle speed sensor 112, and a rotation number calculation means 174 that calculates a motor rotation number based on an input from a rotation position detection sensor 171. The deviation between the target rotation number and the actual rotation number is input into a rotation number control means 175. The rotation number control means 175 and a PWM control means 176 set a control voltage by proportional control and integral control, and thereby control the rotation number of the motor 106 via a drive circuit 172.

In the controller 107, in a phase control means 177, an optimal conduction phase angle of the drive circuit 172 is calculated based on control parameters such as the proportional term and the integral term found in the rotation number control means 175, and the calculation result is reflected in the PWM control means 176 to execute advance angle control.

Further, among conventional motor control circuits that control a speed which varies over a broad range, there is a motor control circuit that has two pre-set advance angle values and switches the advance angle value setting depending on whether a voltage level input into an advance angle value setting terminal is High or Low. For example, in the example of an advance angle value setting circuit shown in FIG. 4, a High/Low voltage level input into a PS terminal (advance angle value setting terminal) is set by an open/short (GND) state of a PSO terminal, and the advance angle value setting is switched in accordance with the switching of the High/Low voltage level setting. A signal for switching the state of the PSO terminal is normally supplied from the outside via an interface of the motor control circuit in accordance with the rotational speed of the motor or the like.

CITATION LIST

Patent Literature

Patent Literature 1: JP 2005-192338 A

SUMMARY OF INVENTION

Technical Problem

However, in the controller 107 shown in FIG. 3, since a control command during rotation of the motor constantly varies due to load variations and the like, there has been a problem in that although the drive efficiency is improved by advance angle control in accordance with the load and the rotation number, small variations in the rotation number occur as a result. For example, when driving a drum of a printer, such small variations in the rotation number (rotation number WOW) can cause printing distortions and the like and thus affect the printing quality. As shown in FIG. 4, in a structure in which the advance angle value is switched by a signal level input into the advance angle value setting terminal, for example, when increasing the number of corresponding advance angle values in order to execute more precise control, it is necessary to configure a complex switching circuit requiring many resistors, switching elements, and the like.

Considering the above problems, an object of the present invention is to provide a motor control circuit that variably controls the speed of a motor, in which an appropriate advance angle value corresponding to the speed of the motor that is set can be automatically set.

Solution to Problem

The below-described embodiments exemplify constitutions of the present invention, and will be explained in an itemized manner in order to facilitate the understanding of the various constitutions of the present invention. Each item is not meant to limit the technical scope of the present invention, and substitutions or deletions of a portion of the constituent elements of each item as well as additions of other constituent elements upon referring to the detailed description of the preferred embodiments are included within the technical scope of the invention.

(1) A motor control circuit in which a detection signal of a frequency that is proportional to a speed of a motor is input from a speed detection means attached to the motor, a reference signal having a frequency corresponding to a target speed is input from outside, and a period of the detection signal and a period of the reference signal are compared to variably control a speed of the motor, the motor control circuit including: an advance angle setting means that adds an advance angle correction value obtained by multiplying a proportional coefficient by a correction amount to a reference advance angle value so as to output an advance angle setting signal, and an advance angle setting correction means that uses a ratio of a correction reference period relative to the period of the reference signal as the correction amount and multiplies the proportional coefficient by the correction amount so as to obtain the advance angle correction value (claim 1).

According to the motor control circuit in the item, it is possible to automatically correct the advance angle value in accordance with variations in the period of the reference signal that is input from the outside. In the motor control circuit that variably controls the speed of the motor, when the speed of the motor varies in accordance with variations in the target speed, the drive efficiency at each speed can be optimized.

Further, in the motor control circuit in the item, since the correction of the advance angle setting is based on the period of the reference signal that is input from the outside, it is possible to carry out advance angle control without any effects on the motor rotation variations by the advance angle setting.

In addition, with the above structure, since the correction of the advance angle setting corresponding to the target speed is carried out automatically within the motor control circuit, an advance angle value switching circuit or an interface for inputting the switching signal from the outside or the like is unnecessary, and the drive efficiency can be optimized with a simple and inexpensive structure.

(2) In the motor control circuit according to the item (1), the motor control circuit further includes a period detection counter into which the reference signal is input, the period detection counter outputting a reference period count value corresponding to the period of the reference signal counted based on a reference clock, and the advance angle setting correction means includes the correction reference period as a correction reference count value corresponding to the correction reference period and also includes a division means that calculates the correction amount by dividing the correction reference count value by the reference period count value (claim 2).

According to the motor control circuit in the item, the motor control circuit in which the advance angle value can be automatically corrected in accordance with variations in the period of the reference signal that is input from the outside can be configured as a fully digital processing circuit that does not use an analog circuit (for example, an integration amp, a resistor, and a capacitor). In particular, when the motor control circuit is configured as an integrated circuit (IC), a high performance motor control circuit can be realized by an IC with a small chip area at low cost utilizing a microfabrication process in which many digital circuits are constituted in a small area.

(3) In the motor control circuit according to the item (1) or (2), the motor control circuit in which the advance angle setting correction means has a plurality of the correction reference periods (claim 3).

According to the motor control circuit in the item, correction of the optimal advance angle setting can be carried out flexibly and easily in a motor with a broad speed variable range.

Advantageous Effects of Invention

The motor control circuit according to the present invention, with the above-described structures, variably controls the speed of the motor, so that an appropriate advance angle value corresponding to the speed of the motor that is set can be automatically set and the drive efficiency thereof can be optimized.

BRIEF DESCRIPTION OF DRAWINGS

FIG. 1 is a block diagram that schematically illustrates a motor drive system including a motor control circuit according to one embodiment of the present invention.

FIG. 4 is a circuit constitution diagram illustrating another example of a conventional motor control circuit.

REFERENCE SIGNS LIST

Figure 2:
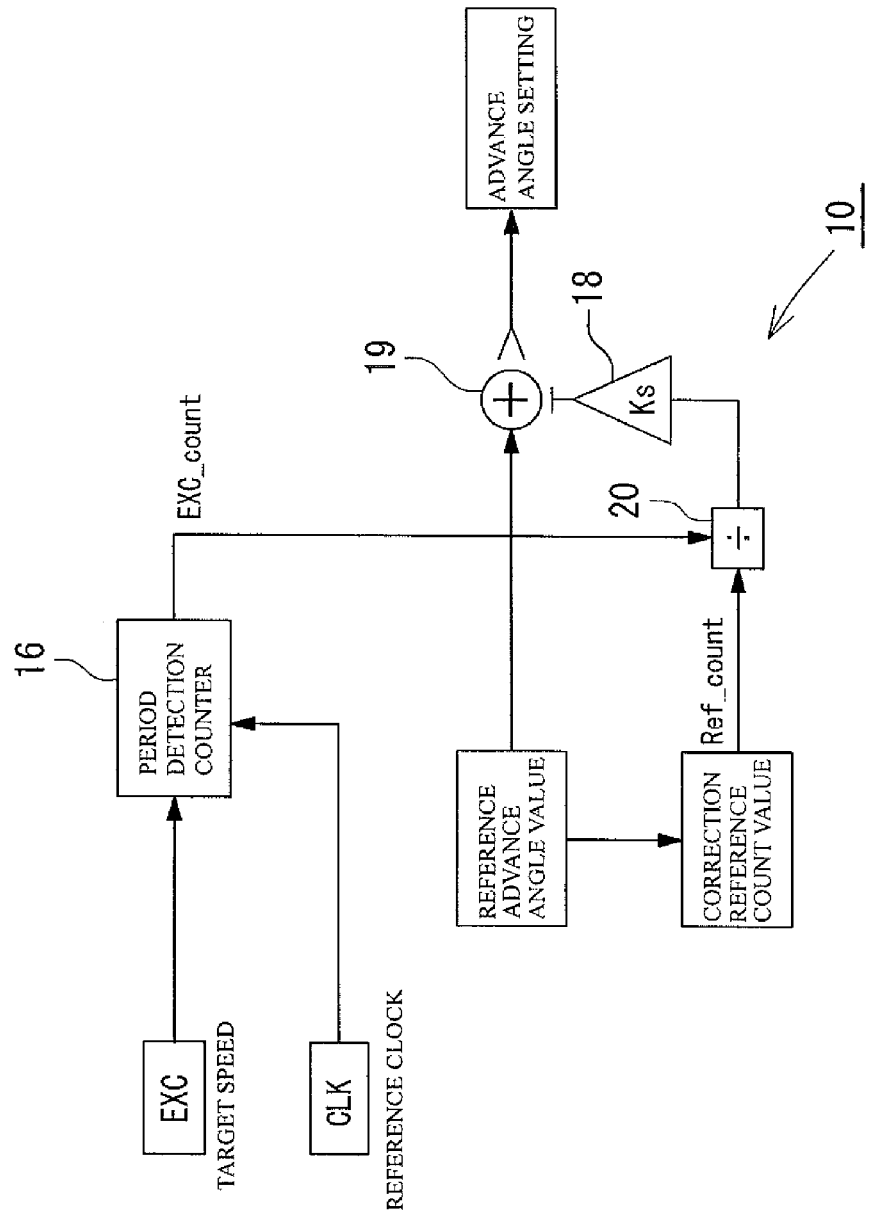
FIG. 2 is a functional block diagram that illustrates the essential parts of the motor control circuit according to one embodiment of the present invention.
Figure 3:
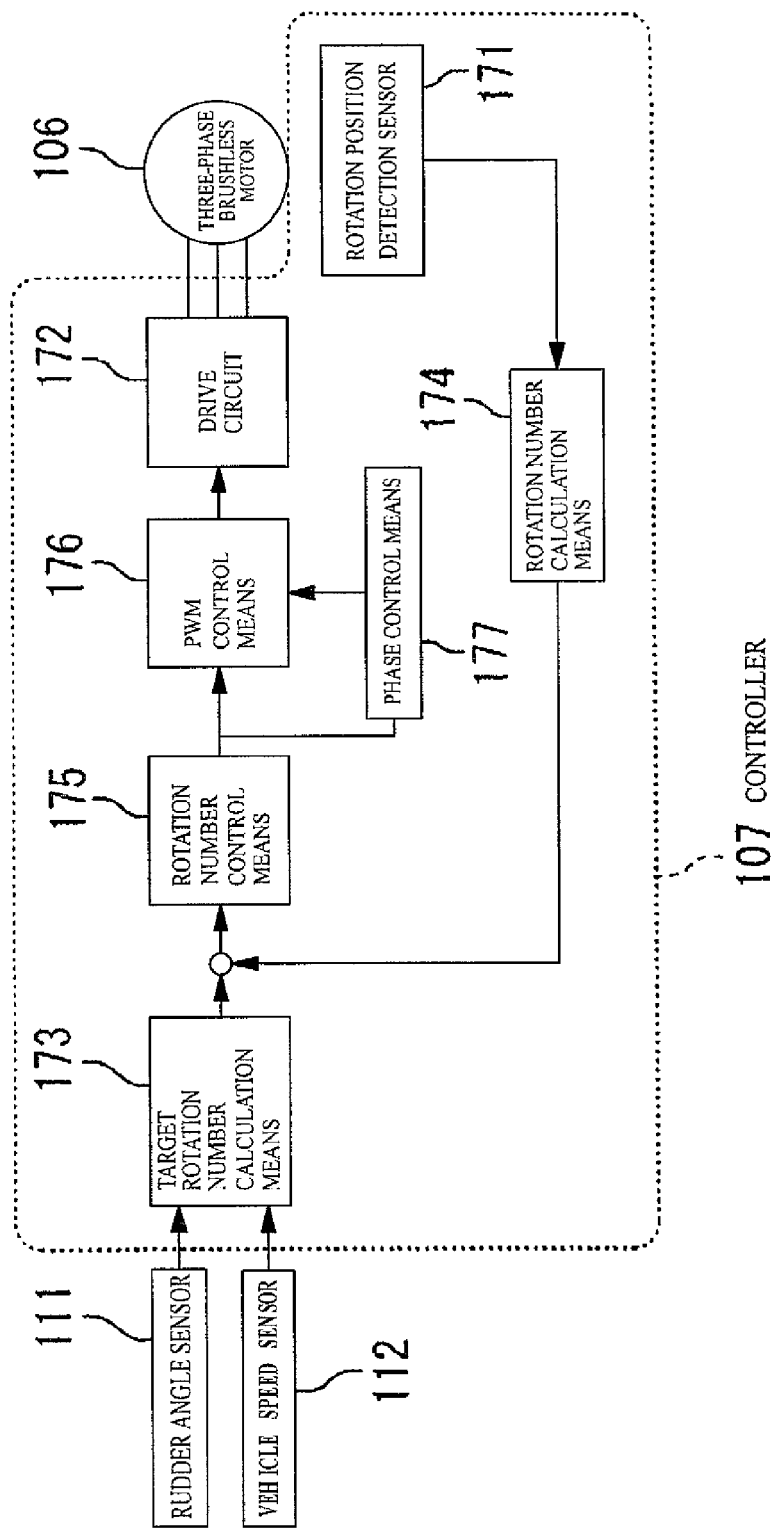
FIG. 3 is a circuit constitution diagram illustrating one example of a conventional motor control circuit.

10: motor control circuit
12: motor
14: frequency generator (speed detection means)
16: period detection counter
18: multiplication means
19: addition means
20: division means

DESCRIPTION OF EMBODIMENTS

Embodiments of the present invention will be explained below referring to the attached drawings.

FIG. 1 schematically illustrates a motor drive system in which a motor control circuit 10 according to the present embodiment is suitably applied. The motor drive system shown in FIG. 1 includes a motor 12 and the motor control circuit 10. A frequency generator (hereinafter also referred to as "FG") 14 is attached as a speed detection means to the motor 12. Into the motor control circuit 10, a frequency detection signal (hereinafter, also referred to as an "FG signal") proportional to the speed (rotational speed) of the motor 12 is input from the FG 14, and a reference signal EXC is input from the outside (for example, a host system of the motor control circuit 10).

In the motor drive system shown in FIG. 1, the reference signal EXC is a signal having a frequency corresponding to a target speed of the motor, and it is assumed that this frequency (in other words, the target speed) is made to fluctuate depending on, for example, various operating conditions of the motor 12. Hereinafter, the structure of the motor control circuit 10 will be explained in detail referring to FIG. 2.

FIG. 2 is a functional block diagram illustrating the essential parts of the motor control circuit 10 according to the present embodiment. The motor control circuit 10 includes a period detection counter 16 into which the reference signal EXC is input. A reference clock CLK having a constant period is supplied to the period detection counter 16. Herein, the motor control circuit 10 preferably includes a means (not illustrated) for generating the reference clock CLK therewithin. However, in the motor control circuit 10 according to the present invention, the reference clock CLK can also be input from the outside.

The motor control circuit 10 also includes an advance angle setting means including an addition means 19, and an advance angle setting correction means including a multiplication means 18 equipped with a predetermined proportional coefficient Ks and a division means 20.

The motor control circuit 10 according to the present invention compares the period of the FG signal and the period of the reference signal EXC to variably control (for example, speed control and phase control) the speed of the motor 12, and further includes constituent elements necessary therefor such as a speed control means and a phase control means. However, illustration and explanation of such constituent elements will be omitted herein because appropriate well-known structures can be used for these elements.

In the present embodiment, the specific structures of the period detection counter 16 can be any appropriate structure as long as they count a period of an input signal based on the reference clock CLK and output the counted value (count value). For example, the period detection counter 16 can include a free-run counter that counts up for each input of the pulse signal that constitutes the reference clock CLK and an input-capture register that detects a rise in the input signal and retains the count value of the free-run counter at that point in time, so as to output a pulse number of the reference clock CLK input during one period of the input signal as a count value corresponding to the period of the input signal by calculating the difference between the count values retained at two following points in time.

In the motor control circuit 10, the advance angle setting means has a pre-set reference advance angle value, and the reference advance angle value is input into the addition means 19. In the addition means 19, the reference advance angle value is added to an advance angle correction value obtained by multiplying a proportional coefficient by a correction amount to be explained later, and an advance angle setting signal obtained thereby is output.

Meanwhile, a reference period count value EXC_count corresponding to the period of the reference signal EXC is output from the period detection counter 16. The advance angle setting correction means of the motor control circuit 10 retains a correction reference period that is pre-set in accordance with the reference advance angle value as a corresponding correction reference count value Ref_count. The reference period count value EXC_count and the correction reference count value Ref count are input into the division means 20, and in the division means 20, the correction amount is calculated by "Ref_count/EXC_count" as a ratio of the correction reference period relative to the period of the reference signal. The correction amount is input into the multiplication means 18 and multiplied by the predetermined proportional coefficient Ks, and thereby the advance angle correction value is calculated. The advance angle correction value is output from the multiplication means 18 to the addition means 19 of the advance angle setting means. Thereby, the reference advance angle value is corrected.

In this way, in the motor control circuit 10, the reference advance angle value for setting the advance angle is automatically corrected in accordance with the period of the reference angle EXC (the reference period count value EXC_count) by the advance angle correction value. Thus, even if the period of the reference signal EXC (in other words, the target speed input from the outside) varies, an appropriate advance angle can be set relative to each speed and thereby the drive efficiency of the motor can be optimized.

Further, in the advance angle setting correction means of the motor control circuit 10, as described above, "the correction reference period/the period of the reference signal EXC" (Ref_count/EXC_count) is used as the correction amount (this corresponds to setting a correction reference speed proportional to "1/the correction reference period", and using a value obtained by normalizing the target speed that is proportional to "1/the period of the reference signal EXC" with the correction reference speed as the target speed for correction). As will be explained below, this constitution is particularly effective in control of a motor with a broad speed variable range.

In the control of a motor with a broad speed variable range, in order to optimize the drive efficiency of the motor, there are cases that demand advance angle settings that differ in accordance with each of a plurality of speed ranges (for example, a low speed range, a medium speed range, and a high speed range) to which the target speed can belong. In response to such a demand, the motor control circuit 10 can be configured to include a plurality of appropriate correction reference periods (for example, correction reference periods for a low speed range, a medium speed range, and a high speed range) in accordance with each of the plurality of speed ranges, and the correction reference period (specifically, the corresponding correction reference count value Ref_count) used in calculating the correction amount is switched depending on the speed range to which the target speed belongs.

Therein, the motor control circuit 10 is preferably configured so that the correction reference period is automatically switched in conjunction with the period of the reference signal EXC (the reference period count value EXC_count).

Thereby, even if the target speed varies over a broad range, the correction amount of the advance angle value can be flexibly and easily switched so that the drive efficiency of the motor is optimized. Further, even if the number of speed ranges is increased, this can be easily dealt with by increasing the correction reference periods retained as data in the advance angle setting correction means without the need to increase the number of parts of the motor control circuit 10.

The motor control circuit 10 can also include a known drive circuit (not illustrated) that drives the motor 12 based on the advance angle setting signal output from the addition means 19 (and a control signal output from another non-illustrated control means (for example, a speed control means and a phase control means)).

The motor control circuit 10 configured as described above handles the period of the FG signal as a count value (i.e. numerical data), and the subsequent processing can all be executed as calculations of numerical data. Therefore, the motor control circuit 10 can be realized as a fully digital processing circuit that does not use an analog circuit. Therein, the constituent components of the motor control circuit 10 can be realized by any appropriate hardware or software or combination thereof as long as they fulfill the functions of the functional blocks explained referring to FIG. 2. This feature of the motor control circuit 10 is particularly advantageous when the motor control circuit 10 is configured as an integrated circuit (IC), in terms of realizing a high performance motor control circuit by an IC with a small chip area at low cost.

The present invention has been explained above based on preferred embodiments thereof, but the present invention is not limited to the embodiments explained above. For example, the present invention also includes cases in which an arbitrary constituent component of the motor control circuit is constituted by an analog circuit having an equivalent function.

The invention claimed is:

1. A motor control circuit in which a detection signal of a frequency that is proportional to a speed of a motor is input from a speed detection means attached to the motor, a reference signal having a frequency corresponding to a target speed is input from outside, and a period of the detection signal and a period of the reference signal are compared to variably control a speed of the motor, the motor control circuit comprising:
an advance angle setting means that adds an advance angle correction value obtained by multiplying a proportional coefficient by a correction amount to a reference advance angle value so as to output an advance angle setting signal; and
an advance angle setting correction means that uses a ratio of a correction reference period relative to the period of the reference signal as the correction amount and multiplies the proportional coefficient by the correction amount so as to obtain the advance angle correction value.

2. The motor control circuit according to claim 1, further comprising a period detection counter into which the reference signal is input, the period detection counter outputting a reference period count value corresponding to the period of the reference signal counted based on a reference clock,
 wherein the advance angle setting correction means includes the correction reference period as a correction reference count value corresponding to the correction reference period and also includes a division means that calculates the correction amount by dividing the correction reference count value by the reference period count value.

3. The motor control circuit according to claim 1, wherein the advance angle setting correction means has a plurality of the correction reference periods.

4. The motor control circuit according to claim 2, wherein the advance angle setting correction means has a plurality of the correction reference periods.

\* \* \* \* \*